(12) United States Patent
Deyo et al.

(10) Patent No.: US 8,099,429 B2
(45) Date of Patent: Jan. 17, 2012

(54) RELATIONAL LINKING AMONG RESOURES

(75) Inventors: Roderic C. Deyo, Redmond, WA (US);
Sandeep Sahasrabudhe, Kirkland, WA (US); Sunil Swami, Sammamish, WA (US); Brian D. Price, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 767 days.

(21) Appl. No.: 11/608,878

(22) Filed: Dec. 11, 2006

(65) Prior Publication Data

US 2008/0140679 A1 Jun. 12, 2008

(51) Int. Cl.
*G06F 17/30* (2006.01)
*G06F 7/00* (2006.01)

(52) U.S. Cl. ......... 707/776; 707/777; 707/778; 707/726
(58) Field of Classification Search .................. 707/1, 2, 707/726, 776–778
See application file for complete search history.

(56) References Cited

U.S. PATENT DOCUMENTS

| | | | |
|---|---|---|---|
| 5,826,261 A | 10/1998 | Spencer | |
| 6,212,494 B1 | 4/2001 | Boguraev | |
| 6,553,366 B1 * | 4/2003 | Miller et al. ........................ | 1/1 |
| 6,654,742 B1 * | 11/2003 | Kobayashi et al. ................ | 707/7 |
| 6,718,324 B2 | 4/2004 | Edlund et al. | |
| 6,895,551 B1 * | 5/2005 | Huang et al. .................. | 715/205 |
| 7,395,259 B2 * | 7/2008 | Bailey et al. ........................ | 1/1 |
| 7,539,632 B1 * | 5/2009 | Chakrabarti et al. ......... | 705/26.1 |
| 7,565,445 B2 * | 7/2009 | Xie .............................. | 709/238 |
| 7,672,943 B2 * | 3/2010 | Wong et al. ................... | 707/709 |
| 7,921,069 B2 * | 4/2011 | Canny et al. .................... | 706/47 |
| 8,020,111 B2 * | 9/2011 | Horvitz et al. ................ | 715/767 |
| 2002/0059069 A1 | 5/2002 | Hsu et al. | |
| 2002/0059343 A1 | 5/2002 | Kurishima | |
| 2003/0028528 A1 | 2/2003 | Christensen et al. | |
| 2003/0200304 A1 * | 10/2003 | Thorpe et al. .................. | 709/224 |
| 2004/0133589 A1 * | 7/2004 | Kiessig et al. ................ | 707/102 |
| 2004/0220963 A1 * | 11/2004 | Chen et al. ................ | 707/103 R |
| 2005/0108630 A1 | 5/2005 | Wasson et al. | |
| 2005/0114759 A1 | 5/2005 | Williams | |
| 2005/0195660 A1 * | 9/2005 | Kavuri et al. ............. | 365/189.05 |
| 2006/0069589 A1 * | 3/2006 | Nigam et al. ...................... | 705/1 |
| 2006/0106847 A1 * | 5/2006 | Eckardt et al. ................ | 707/101 |
| 2006/0168125 A1 | 7/2006 | Leo Spork | |
| 2006/0184521 A1 * | 8/2006 | Ponte ................................ | 707/5 |
| 2006/0200435 A1 * | 9/2006 | Flinn et al. ...................... | 706/12 |
| 2006/0200556 A1 | 9/2006 | Brave et al. | |
| 2006/0212350 A1 * | 9/2006 | Ellis et al. ....................... | 705/14 |
| 2007/0073748 A1 * | 3/2007 | Barney ........................ | 707/101 |
| 2007/0198249 A1 * | 8/2007 | Adachi et al. ..................... | 704/9 |

(Continued)

OTHER PUBLICATIONS

Viktor de Boer, Maarten van Someren, and Bob J. Wielinga Relation Instantiation for Ontology Population Using the Web 2007; Springer-Verlag Berlin Heidelberg; Proceedings of the 29th Annual German Conference on AI, KI 2006; 12 pages.*

(Continued)

*Primary Examiner* — Neveen Abel Jalil
*Assistant Examiner* — Polina Peach
(74) *Attorney, Agent, or Firm* — Merchant & Gould

(57) ABSTRACT

Systems and methods that integrate user assigned association among a plurality of resources or entities. The subject innovation employs an association component that relates such resources or entities, based on aggregate of user notions that are assigned for relationships; and/or based on how users perceive existence of relationships among such resources. Accordingly, resources can be related (e.g., linked, matched, tagged and the like) based on relevance of collective user behavior during tagging.

16 Claims, 11 Drawing Sheets

U.S. PATENT DOCUMENTS

2008/0027971 A1* 1/2008 Statchuk .................. 707/102
2008/0109232 A1* 5/2008 Musgrove et al. ............. 705/1
2010/0094910 A1* 4/2010 Bayliss .................... 707/800

OTHER PUBLICATIONS

Alani, Harith et al.; "Automatic Ontology-Based Knowledge Extraction and Tailored Biography Generation from Web Documents"; 2003; IEEE Intelligent Systems; pp. 14-21.*

Jacquin, T., et al; Demo Abstract: A Web-based Document Harmonization and Annotation Chain: from PDF to RDF; Nov. 2005; 2 pages.

Wu, X., et al.; Exploring Social Annotations for the Semantic Web; May 2006; 10 pages.

Brooks, C., et al; Improved Annotation of the Blogosphere via Autotagging and Hierarchical Clustering; May 2006; 7 pages.

Ciravegna, F., et al; User-System Cooperation in Document Annotation based on Information Extraction; 16 pages.

* cited by examiner

RELATIONAL LINKING AMONG RESOURES

BACKGROUND

Enterprise search and discovery systems typically interact with complex and highly diverse information sources and entities (e.g., people, paper documents, static and dynamic web pages, files, emails, multimedia files, and the like.) An enterprise knowledge and document search system reliably discovers, combines, and ranks for relevance structured (e.g., relational or geographic database), semi-structured (e.g., web, email, other XML files), and unstructured information (e.g., flat text documents). Moreover, the search system can employ context and scope to help disambiguate search queries as well as support necessary enterprise requirements for fine-grained access control for security and multi-language support.

For example, to maximize likelihood of locating relevant information amongst an abundance of data, search engines are often employed to search the entire world-wide web or a distinguished subset of sites on the web. In some instances, a user is aware of the name of a site, server, or URL to the site that the user desires to access. In such situations, the user can access the site, by simply entering the URL in an address bar of a browser and connecting to the site. However, in most instances, the user does not know the URL or site name that hosts the desired content/information. To locate a site or corresponding URL of interest, users often employ a search engine to facilitate locating and accessing sites based on user-entered keywords and operators.

A search engine is a tool that facilitates web navigation based on entry of a search query comprising one or more keywords. Upon receipt of a query, the search engine retrieves a list of website resources matching the keywords, typically ranked based on relevance to the query. To enable this functionality, the search engine must typically generate and maintain a supporting infrastructure. Agents for such search engines (e.g. spiders or crawlers) navigate websites in a methodical manner and retrieve information stored on sites visited. For example, a crawler can make a copy of all or a portion of websites and related information. The search engine subsequently analyzes the content captured by one or more crawlers to determine how a page or document will be indexed. Indexing transforms website data into a form, the index, which can be employed at search time to facilitate identification of content. Some engines will index all text on a website's resources while others may only index terms associated with particular components (e.g., title, header, or meta-tag). Crawlers must also periodically revisit web pages to detect and capture changes thereto since the last indexing.

Upon entry of one or more keywords as a search query, the search engine retrieves information that matches the query from the index, ranks the resources that match the query, generates a snippet of text associated with matching sites and displays the results to a user. Furthermore, advertisements relating to the search terms can also be displayed together with the results. The user can thereafter scroll through a plurality of returned resources, ads and the like in an attempt to identify information of interest. However, this can be an extremely time-consuming and frustrating process as search engines can return a substantial number of resources. More often then not, the user is forced to narrow the search iteratively by altering and/or adding keywords and operators to obtain the identity of websites including relevant information. Web pages themselves have become dynamic and even more complex over time and have even challenged the smartest of the search crawlers. Employment of scripting and other automated means have generally left the average search crawlers misinterpreting and/or missing entirely the information on some Web pages. A search crawler typically looks at textual data and associated resource data to index.

Likewise, enterprise search solutions rely to a large extent on traditional Information Retrieval (IR) paradigms based on match query and document keywords, and/or categories using formal or informal taxonomies. In general, such approach focuses on text-based keyword tokens that are matched using variations of Boolean, vector space, or probabilistic models, augmented by additional document- or context-derived metadata, complex heuristics, or classification schemes.

Such solutions typically fail to address additional explicit and implicit metadata (user and community or automated tags, entity semantic structure, and the like). In addition, opinion and experiences of other users (e.g., experts, communities, informal roles, trustworthiness, and the like) who have performed similar searches are not efficiently employed in these solutions.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for systems and methods that integrate user preferred associations among a plurality of resources/entities, via employing an association component. The association component relates such resources/entities based on aggregate of user notions that are assigned to relationships for the resources/entities; and/or based on how users perceive existence of relationships among such resources/entities. For example, individual users establish relationships, interactions, and metadata associations among resources/entities, and the system analyzes aggregate of such established relationships, to determine/infer additional information regarding the resources/entities (e.g. wisdom of crowd such as metadata annotations, relevance ranking, and the like). Subsequently, search engine relevance algorithms can be supplied with such additional information (e.g. extra metadata for inverted index search tables) to facilitate enterprise information and entity discovery. Moreover, community supplied ratings and established resource/entity relations can be employed for evaluating a user's trustworthiness and authority, in determining relationships among resources. Auto-completion of tags (and other metadata) can also be supplied to facilitate user interaction and maintain consistency. In addition, various group levels with different security settings can be defined, which supply access to metadata annotations at different levels.

In one aspect, the association component associates aggregated user views of relationships among resources/entities (resource/entity relationship), with metadata that is employed when tagging of such resources and relationships. Accordingly, resources can be related (e.g., linked, matched, tagged and the like) based on relevance of collective user behavior during tagging. By leveraging the relationships and/or behavioral characteristics between entities or metadata (e.g. calculation of importance or activity of an individual user, or collection of tags with respect to all tags that exist in "tagspace"), the subject innovation can discover content that is related to each other, in ways that make sense to the users of the content itself.

The association component can be part of a three-tiered structure, namely; a client tier (which manages user experience for the entities/resource relationships); a middle tier (which implements logic involved to relate resources and infer additional information—such as clustering and machine learning—regarding resources/entities); and a back end tier (which lays out the storage tier and supplies database pivots and joins in support of resource/entity relationships, users and metadata.) Accordingly, as opposed to associations among resources being limited by inherent viewpoints/scopes of the author/creator of the resources—the subject innovation supplies unique references (e.g., links in forms of data types, metadata) to tie resources, wherein to users it appears that user preferred links has been directly added to such resources. For example, web users can link two existing web pages based on user preferences, which can be independent of association preferences set by creators of such web pages. Various machine learning systems can also be supplied by employing artificial intelligence components that can exploit the established community resource relationship structure created as part of collective user behavior.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
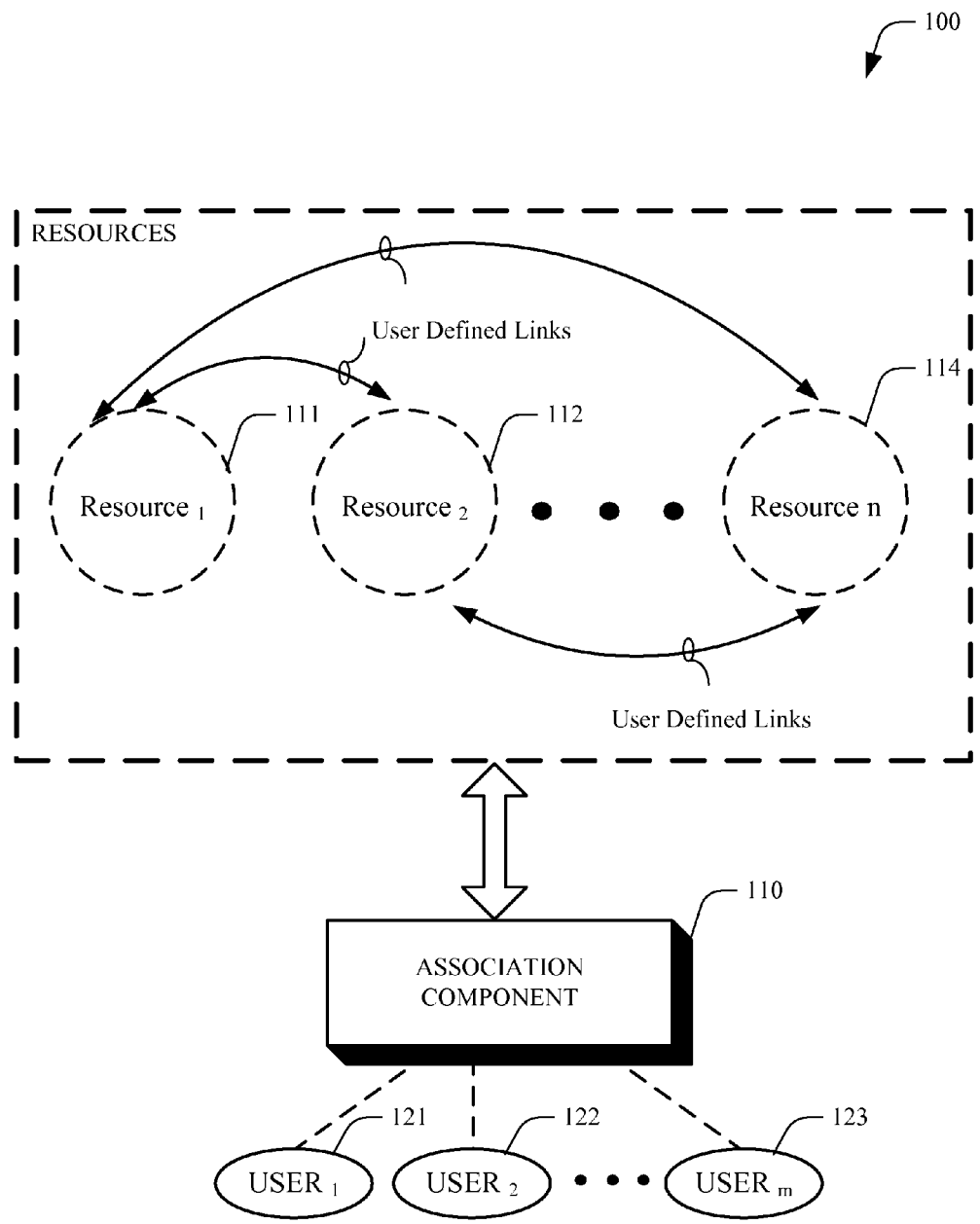
FIG. 1 illustrates a block diagram of an exemplary system that determines relationships based on aggregate of user assigned notions for resources/entities relationships.

FIG. 1 illustrates a system 100 that user preferred association among a plurality of resources (and/or entities), via employing an association component that relates such resources together, based on aggregate of user notions regarding resource relationships and/or how users perceive existence of relationships among such resources. The resources 111, 112, 114 (1 to n, n being an integer) can include an entity that can have metadata associated to it, such as office documents, web pages, sites, email, people, profiles, tags, enterprises, photographs, word processing files, spreadsheets, and the like, as well as web pages, emails, and any other suitable types of data items. Such resources 111, 112, 114 can further include items of a substantially similar type or items of disparate types, and can be restricted based upon desired implementation. For example, the resources 111, 112, 114 can reside within a computer, be associated with item a hard drive, a removable storage media, an application(s), and the like. At least some of the resources 111, 112, 114 can also be related to the Internet or an intranet—for example, a web site(s) can be associated with a particular tag.

Individual users 121, 122, 123 (1 thru m, where m is an integer) can establish relationships among resources 111, 112, 114 and the association component 110 can analyze aggregate of such established relationships, to infer additional information regarding the resources (e.g. wisdom of crowd such as metadata annotations, relevance ranking, and the like). Accordingly, search engine crawlers (not shown) can be supplied with such additional information (e.g., extra metadata for inverted index search tables) to facilitate enterprise management and search. Moreover, community ratings and established resource relations can be employed for evaluating a user's trustworthiness and authority, in determining relationships among resources. Auto-completion of tags can also be supplied to facilitate user interaction and maintain consistency. In addition, various group levels with different security settings can be defined, which supply access to metadata annotations at different levels.

In one aspect, the association component 110 associates aggregated user view of relationships among resources (e.g., resource relationship), with metadata that is employed when tagging of such resources. Accordingly, resources 111, 112, 114 can be related (e.g., linked, matched, tagged and the like) based on relevance of collective user behavior during tagging. Relevance of collective user behavior during tagging can be established by analyzing aggregated tagging behavior of users, and evaluating convergence of such tagging trends, to identify criteria for defining relationships among resources (e.g., taxonomy applications for tags). By leveraging the relationships and/or behavioral characteristics (e.g., calculation of importance tags with respect to all tags that exist in "tagspace"—such tags can include text keywords, phrases, notes, links, ratings, author role, and the like that are associated to a web site or page, Office document, or email. Tags are generally added to facilitate re-discovery of the entity by the tagger or by a desire to share the entity information with the community.) Moreover, as used herein, the term "tag" can refer to a user defined identifying indicia (e.g., keyword), which is applied to an item of content as metadata. The system 100 can employ such tags to provide for deducing taxonomy (e.g., for classification purposes) based on relationships of these tags and items. A data driven model of user tagging behavior can be employed, such as modeling items that are being tagged similarly by a plurality of users. Accordingly, resource relation ships can be established and resources related to each other, in ways that make sense to the users of the content itself.

As explained earlier, unique references (e.g., links in forms of data types, metadata, resource locations, hash signature, and the like) can be employed to tie resources, wherein to users it appears that user preferred links has been directly added to such resources. For example, web users can link two existing web pages based on user preferences, which can be independent of association preferences set by creators of such web pages. It is to be appreciated that the subject innovation is not limited to determining relationships among resources, and such relationships can also be identified among entities, such as people, paper documents, static/dynamic web pages, files, emails, multimedia files, and the like. Moreover, such relationships can further encompass metadata associations, various interactions, and the like—which can exist among any combination of users, resources and entities.

Figure 2:
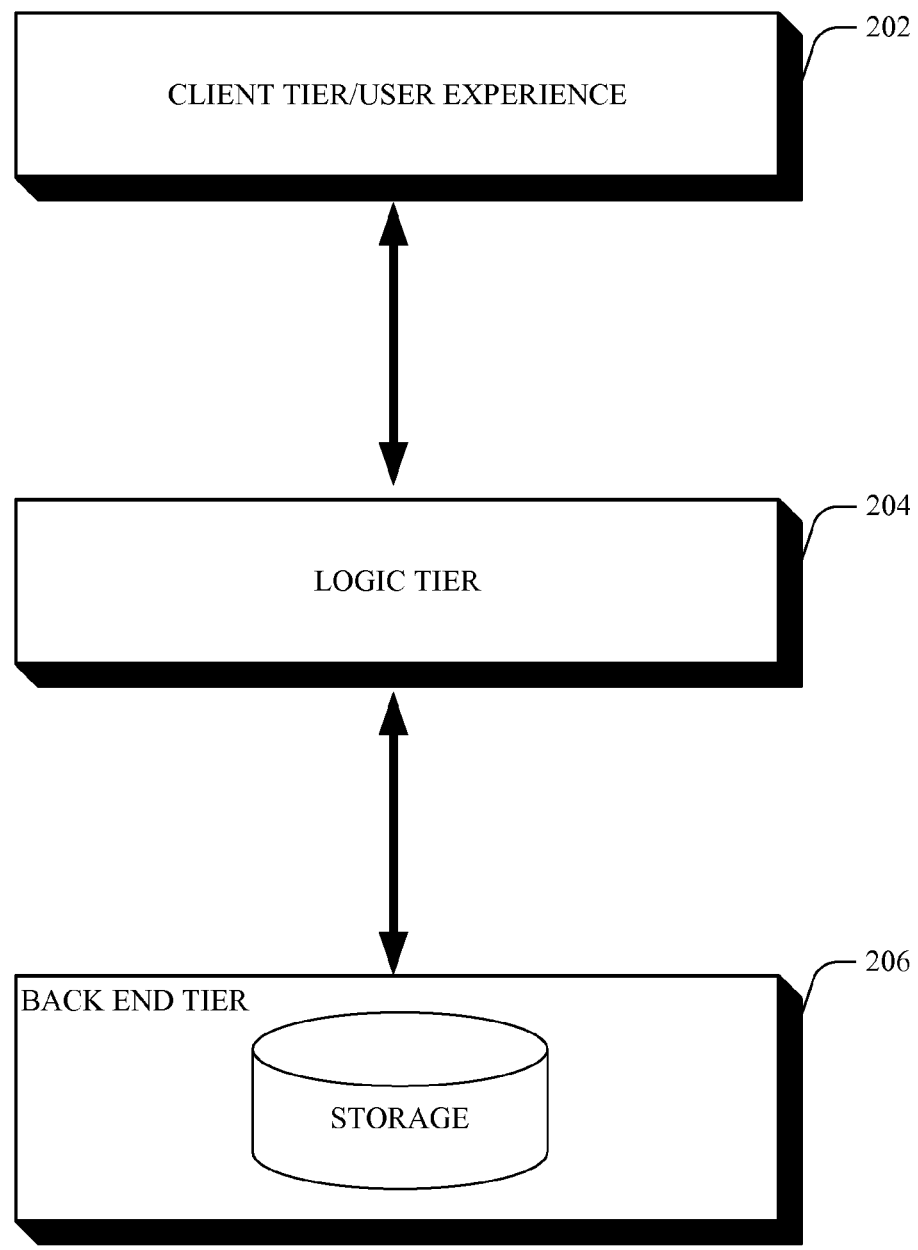
FIG. 2 illustrates a three tiered architecture that relates resources based on users perception for existence of relationships among such resources.

FIG. 2 illustrates of a three-tiered structure in accordance with an aspect of the subject innovation, which includes a client tier 210 (which manages user experience, e.g. autocompletion); a middle tier 220 (which implements logic involved to relate resources and infer additional information—such as clustering/machine learning and employing existence of links as metadata—regarding resources); and a back end tier 230 (which lays out the storage tier and supplies database pivots and joins in support of resource relationships.) Accordingly, as opposed to associations among resources being limited by inherent viewpoints/scopes of the author/creator of the resources—the subject innovation supplies unique references (e.g., links in forms of data types, metadata) to tie resources, wherein to users it appears that user preferred links has been directly added to such resources. For example, relations based on user preferences and independent of what has been originally specified by authors of content, can be established to link resources together.

Figure 3:
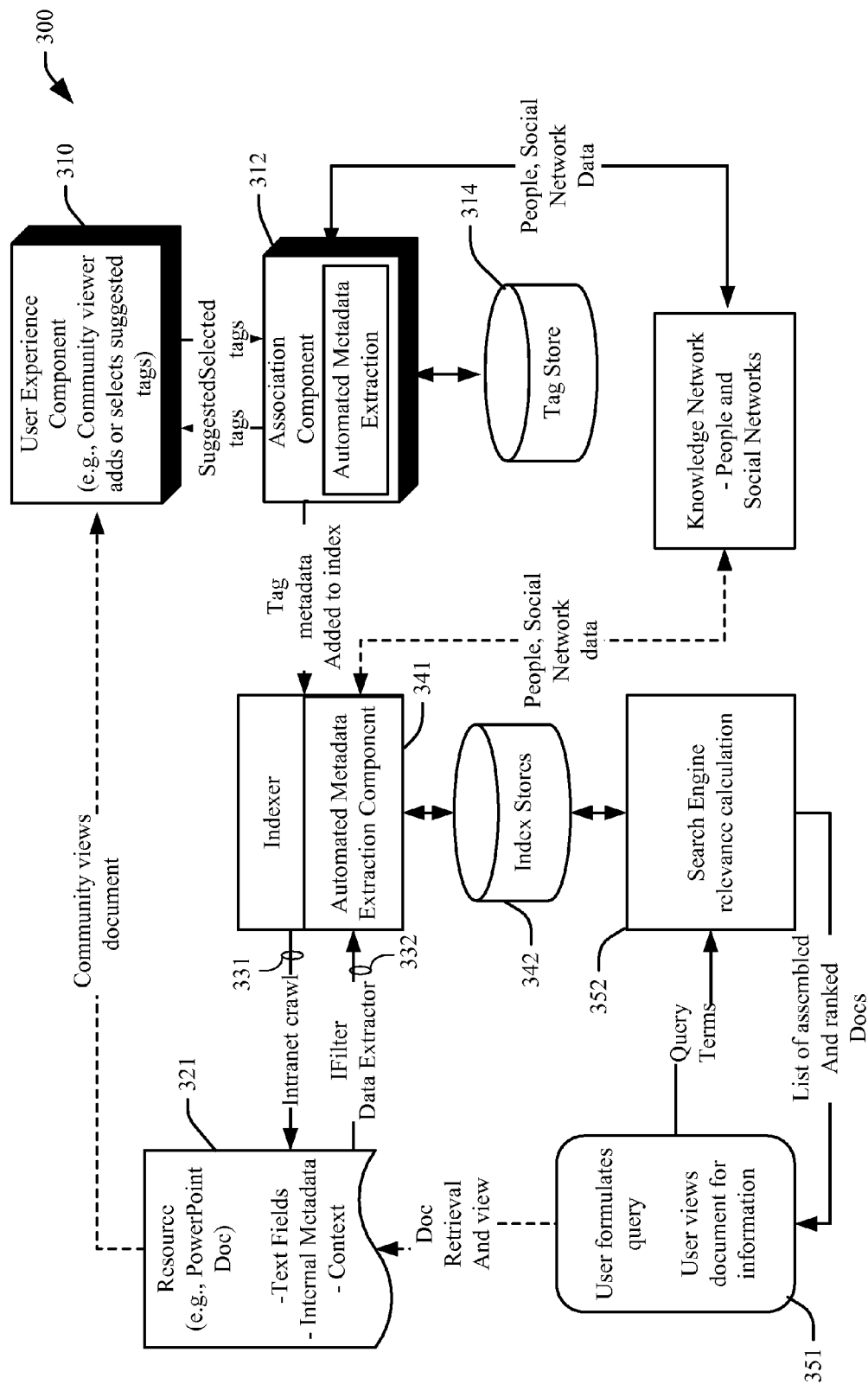
FIG. 3 illustrates a block diagram for a system that infers relationships among resources in accordance with an aspect of the subject innovation.

FIG. 3 illustrates a block diagram for a system 300 in accordance with an aspect of the subject innovation. The user experience component 310 can act as the client tier that interacts with the association component 312 (e.g., as part of the middle tier) and the tag store (e.g., back end tier) 314. A plurality of users can initially establish relationships among plurality of resources. For example a resource 321 can initially be subject of a search via an intranet crawler at 331 by a plurality of users. Next, and at 332 data extractor information can be pulled in text form that can be employed by search engines, via the automated metadata extraction component 341. Such extracted metadata can be stored at index store at 342, wherein the metadata can be added to the index. Accordingly, the resource 321 has been tagged by the community as being relevant for a particular purpose (e.g., via tags, metadata, ratings, author indexing, and the like). A user can employ such additional relations via a query 351 that employs terms familiar to the user, and not necessarily terms designate by the author/creator of resource 321. Such query can be submitted to the search engine 352, wherein additional metadata identified by the community is employed by such search engine 352, to return results based on users view (as opposed to creator and/or original indexing) of the document.

For example, users can search for previously tagged resources and documents via employing an easy to remember tag that such users have added to help find the information again. By using personal tags and notes, a user can typically avoid search failures that can result from poor query construction and relevance feedback support. Moreover, observing which tags other users have employed facilitates access to knowledge and information of other users. Also, a publication component (not shown) can notify users regarding a change of relationships that can occur among entities/resources.

Figure 4:
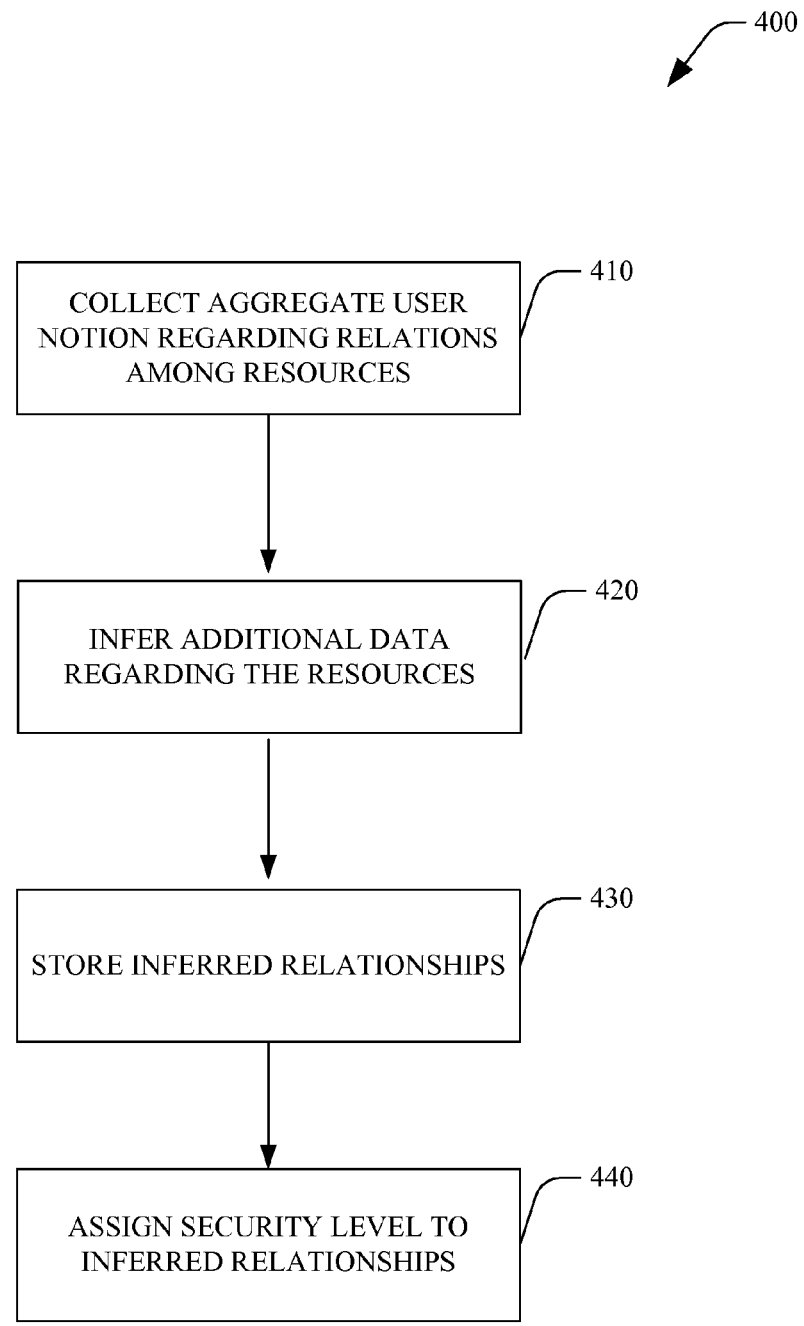
FIG. 4 illustrates an exemplary methodology of inferring additional data for resources based on aggregate user notions regarding establishing relationships among such resources.

FIG. 4 illustrates a related methodology in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 410 aggregated user view of relationships among resources (resource relationship), can be established. Next and at 420 additional data regarding such resources can be identified based on aggregate of user notions regarding resource relationships and/or how users perceive existence of relationships among such resources. Such inferred relationships can then be stored at 430 and a security level assigned to the inferences (e.g., high level, medium level, low level), based on which user requests access, at 440. It is to be appreciated that aggregate user notion(s)/view(s) can be based on machine learning, assigned notions, inferred notions, metadata associations, various interactions, and the like.

Figure 5:
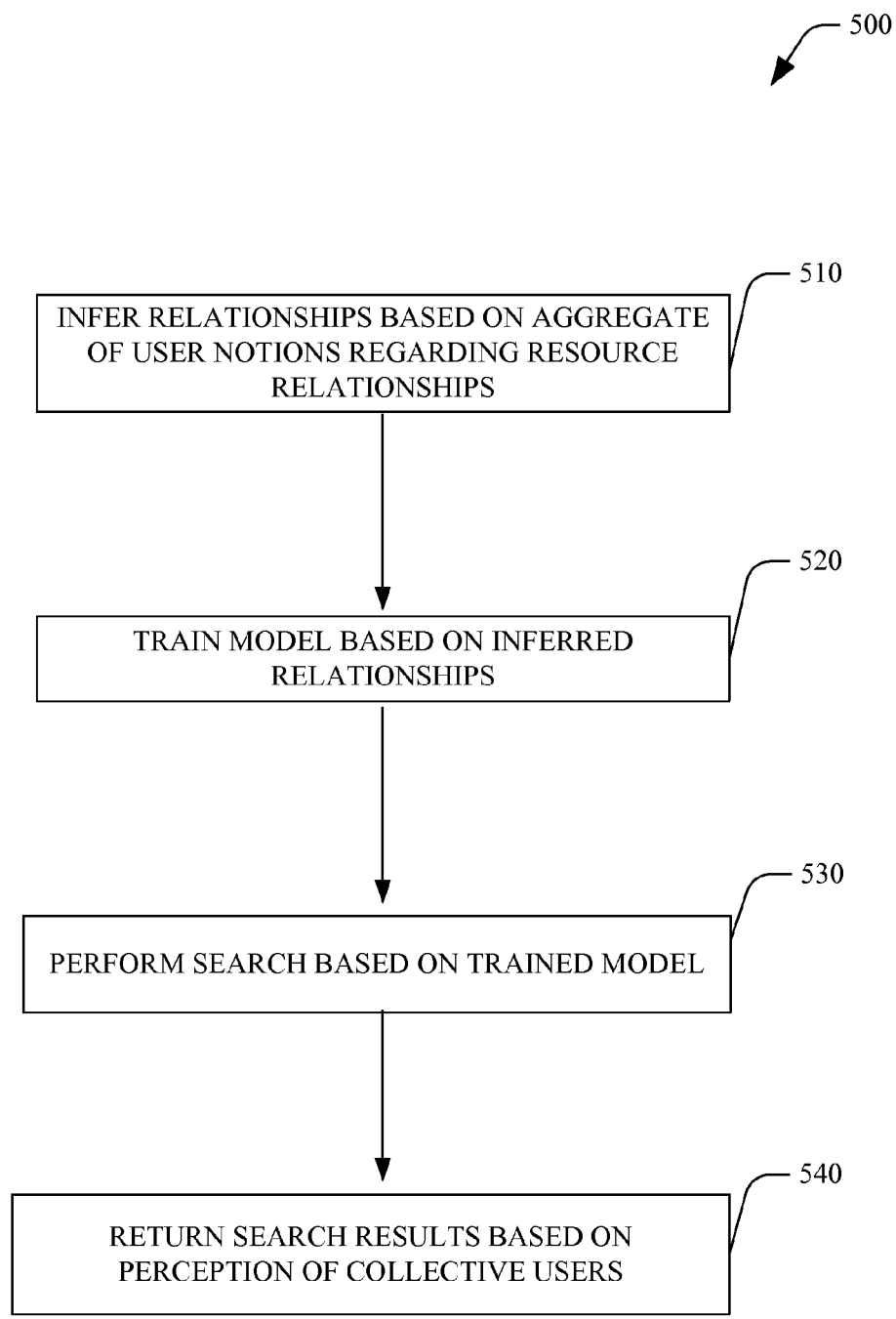
FIG. 5 illustrates a further methodology of resource search based on inferring relationships in accordance with an aspect of the subject innovation.

FIG. 5 illustrates a related methodology 500 of searching based on aggregate of user notions regarding resource relationships in accordance with an aspect of the subject innovation. Initially, and at 510 additional data and/or relationships can be inferred for the resources based on how users actually perceive existence of relationships among such resources (e.g., thru user tagging behavior of the resources.) Next, and at 520 a machine learning system (e.g., an artificial intelligence system as described in detail infra) can be trained based on such inferred relationships among the resources, to facilitate a search. At 530 a search (e.g. for a new user requiring such resources) can be performed based on the training model. Accordingly, search engine crawlers and/or relevance algorithms can be supplied with such additional information (e.g., extra metadata for inverted index search tables) to search in ways that make sense to the users of the content itself (e.g., wisdom of crowd)—to return the results at 540.

Figure 6:
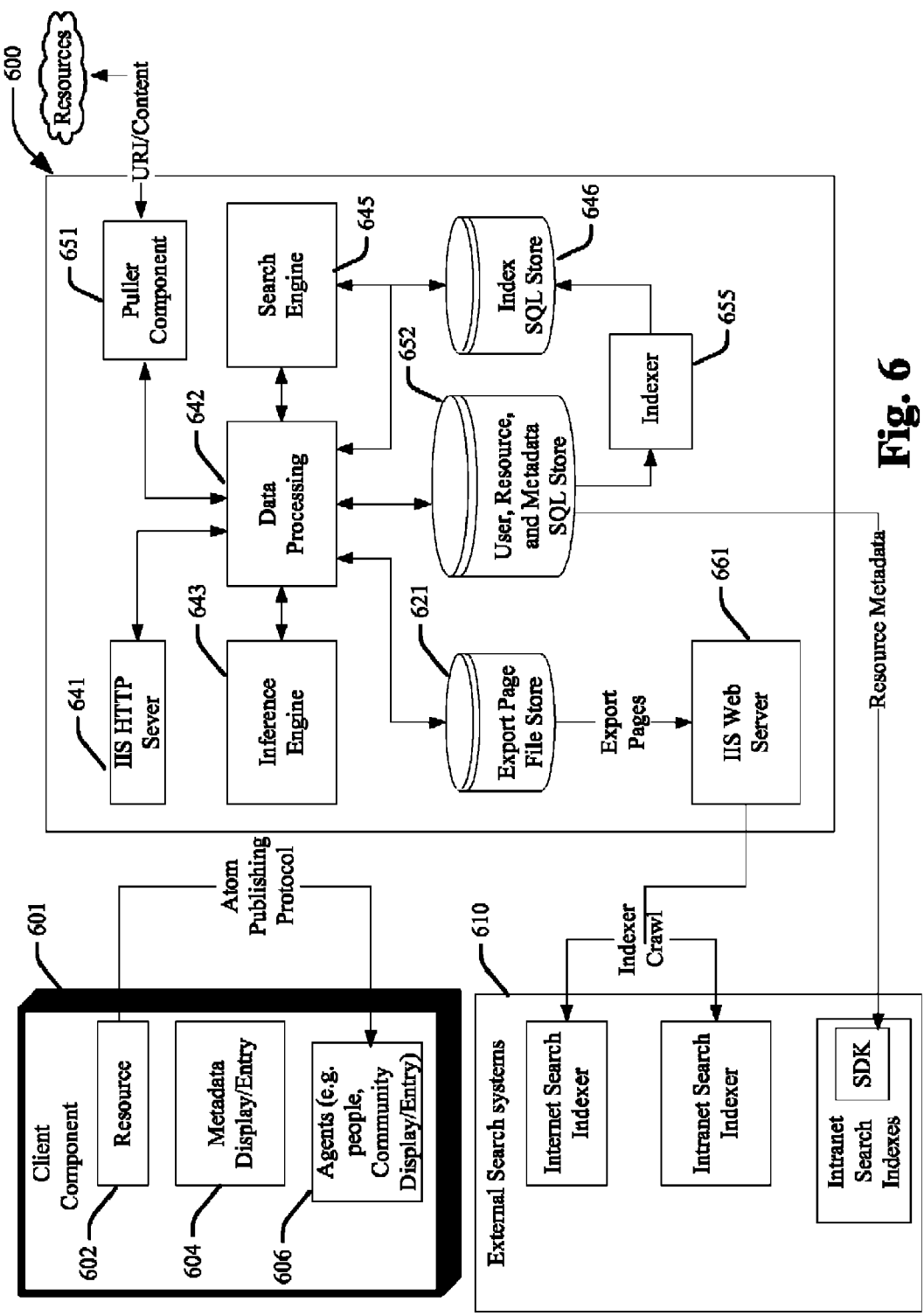
FIG. 6 illustrates a further block diagram of a particular system that infers relationships based on aggregate of user notions regarding resource relationships.

FIG. 6 illustrates a system 600 that can associate documents with metadata based on how users perceive existence of relationships among such resources e.g., wisdom of crowd such as metadata annotations, relevance ranking, and the like. The client component 601 incorporates resources 602 that can include any identifiable item by the agents 606 (automated components, people) that actually perform the tagging via the metadata 604, and add such metadata to the resources. Such client component 601 can connect into an external search system 610 that perform the search with additional metadata as described above. In addition, fake pages can be viewed by regular internet crawlers, via the export page file store 621, wherein metadata can be exposed as fake web pages (e.g., every user can have a list of URL that have been tagged) and viewable by an indexer, to be employed directly by the search engine—(the export page file store 621 can store exported data for external intranet and internet search engines.)

For example, an inverted look up table can be enhanced via additional extra rows based on metadata that implements user notions regarding resource relationships. Moreover, the Internet Information Services (IIS) (which functions as a set of Internet-based services for servers) can connect the client component 601 and host the IIS server. Likewise, data processing 642 can perform the business logic for the middle-tier processing—(e.g., performing user, resource, and metadata transactions on the SQL store), and the inference engine 643 can perform auxiliary processing for machine learning, clustering, and data mining algorithms. Furthermore, the search engine 645 can perform metadata search indexing and other matching, search, and ranking functions, for example. Also, the indexer 655 can incrementally index a user, resource, metadata and other data, to store such indexed results as part of the Structured Query Language (SQL) index database 646, which can store data for subsequent use by the search engine 645. Similarly, the puller component 651 can perform off-line pulling of resources for extracting metadata and creating "tag pools". The storage medium 652 can function as a database for storing user, resource, and metadata, along with join tables, groups, and other transacted data. The IIS web server 661 can function as a web server that hosts the export pages for external intranet and internet search engine crawlers. Accordingly, resources can be related (e.g., linked, matched, tagged and the like) based on relevance of collective user behavior during tagging. By leveraging the relationships and/or behavioral characteristics (e.g., calculation of importance or activity of individual or collection of tags with respect to all tags that exist in "tag-space"), the subject innovation can discover content that is related to each other, in ways that make sense to the users of the content itself (e.g., independent of relations specified by creators of such content). Thus, rather than expecting user(s) to adhere to a predefined set of hierarchical categories, the system 600 allows discovery of relations among individual/collective user(s). By leveraging the relationships that exist in "tag-space" in unique ways, the subject innovation can discover content that is related to each other (e.g., in a manner that makes sense to the users of the content itself, as opposed to relations defined by creators of such content). Based, at least in part, upon the tagged content and user behavior relationships between items (e.g., creating a pseudo-hierarchy), trends can be discovered and examined to verify whether they in fact converge, hence identifying a criteria for taxonomy purposes, for example.

Figure 7:
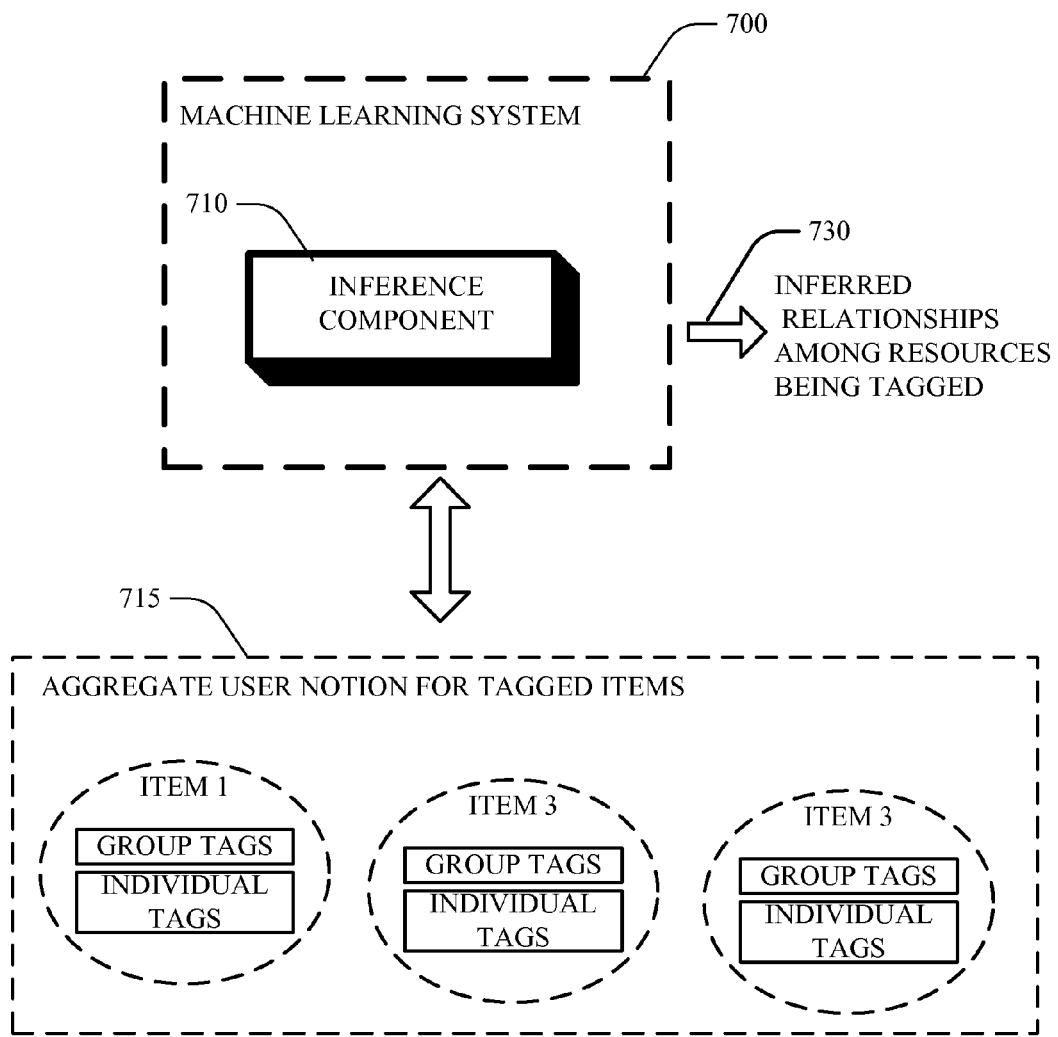
FIG. 7 illustrates a machine learning system that employs a machine learning system to infer relationships among resources being tagged.

FIG. 7 illustrates a machine learning system 700 that has an inference component 710 in accordance with an aspect of the subject innovation. The system 700 infers relationship 720 about resources being tagged based on aggregate of user notions during tagging of resources. Thus, rather than expecting user(s) to adhere to a predefined set of hierarchical categories, the system 700 allows inferring additional relationships among resources that are tagged by user(s). As explained earlier, by leveraging the relationships that exist in "tag-space" in unique ways, users can discover content that is related to each other (e.g., in a way that makes sense to the users of the content itself—as opposed to creators of such contents).

The inference component 710 can employ one or more algorithms in order to infer possible relationships between tagged items. For example, the inference component 710 can employ an algorithm that scores each potential tagging trend for auto suggesting by assigning a "point" for each time, an item that has been employed with such tagging trend (e.g. one of the tags currently attached to a focus item such as coincident tag(s) is tagged accordingly by a user.) Tagging trends with the highest number of points can be considered the "best" tags for auto suggestion of trends, for example. Selecting the list of potential tagging trends, and which ones are likely auto suggests can be accomplished by employing statistical analysis. For example, calculations on the number of standard deviations away from the statistical mean, where item(s) more than two standard deviations away, can be employed for auto suggesting a tagging trend based on collective behavior of users. Such algorithm can be designated as a possible tagging trend, and provide users with a way to browse very popular and potentially relevant item(s).

In another example, the inference component 710 can employ a Bayesian classifier style of categorization. Accordingly, the inference component 710 typically computes the probability of an item associated with a tag from a plurality of tagging behavior by users. The inference component 710 can employ the probabilities to suggest inferred relationships among tags. In yet a further related example, the inference component 710 can score each potential tagging trend for auto suggestion by assigning it a point for each time, such tagging trend has been used by a user. Tagging trends with the highest number of points can be considered suitable for auto suggestion. It is to be appreciated that the inference component 710 can employ any appropriate inference algorithm for inferring relationship between tagged items 715, and any such algorithm is within the realm of the subject innovation. Moreover, the inference component 710 can, optionally, receive user feedback with respect to the inferred relationship(s). The inference component 710 can also employ feedback when inferring relationship (e.g., adapt an inference model). The inference component 710 can also facilitate tag generation based on what the system already knows—(in addition to users notions of relationship among resources)—about context of tagging activities It is to be appreciated that new tags and/or relationships can also automatically be created without typically user input based compiling metadata (beyond plurality of users and aggregated behavior.)

Moreover, collective behavior of users interacting with tagging can be interpreted, for such identification, wherein the system can adapt to changing user behavior patterns. It is to be appreciated that users can tag the same item in different ways, and such item will subsequently appear under a plurality of tagging trends. Moreover, community ratings and established resource relations can be employed for evaluating a user's trustworthiness and authority, in determining relationships among resources.

In a related aspect, artificial intelligence (AI) components can be employed to facilitate inferring relationships among resources based on aggregate of user notions regarding resource relationships. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
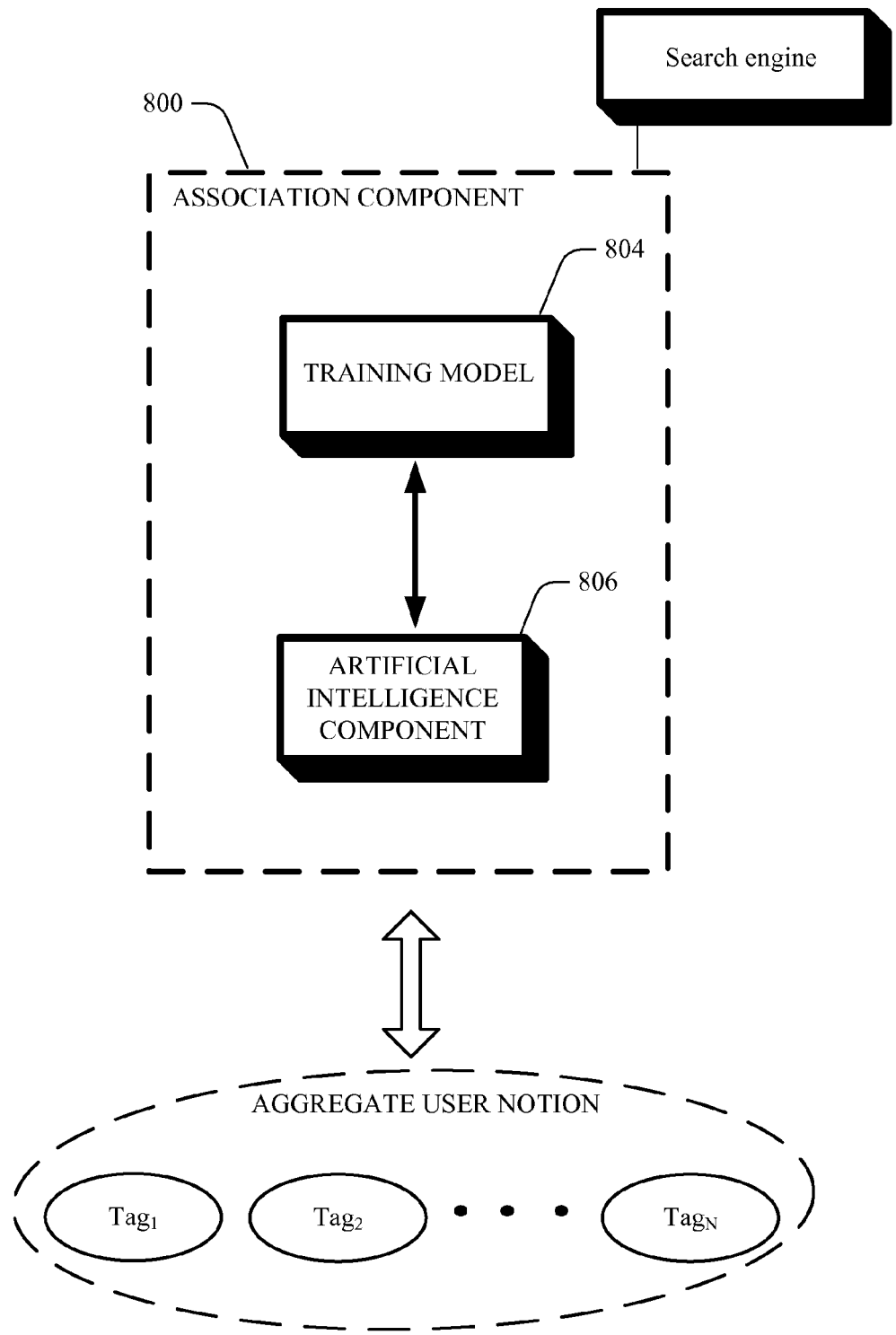
FIG. 8 illustrates an association component with an artificial intelligence component that can interact with a training model to infer additional data about resources and facilitate search.

FIG. 8 illustrates an association component 800 that incorporates an artificial intelligence component 806 in conjunction with a training model 804, in accordance with an aspect of the subject innovation. For example, a process for determining the tagging trends can be facilitated via an automatic classifier system and process. A classifier is a function that maps an input attribute vector, x=(x1, x2, x3, x4, xn), to a confidence that the input belongs to a class, that is, f(x) =confidence(class). Such classification can employ a probabilistic and/or statistical-based analysis (e.g. factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g. financial versus non-financial, personal versus non-personal, and the like.)

The association component 800 can facilitate an automatic interpretation of relations among resources based on aggregate of user notions regarding resource relationships. By exploiting the aggregate behavior of users (e.g., not treating each user as an individual expert) the subject innovation can mitigate noise, and generate relevance judgments from user behavior and/or feedback of users. Examples of behavioral characteristics can include quantity of coincident tags, calculation of importance tags with respect to a focus tag, and the like. Thus, rather than expecting user(s) to adhere to a pre-defined set of hierarchical categories, the system allows user(s) to view those item(s) that are "more" or "less" like the current context they are viewing. The system can thus enhance the browsing capability, and therefore, discoverability of content. By leveraging the relationships that exist in "tag-space", users can discover content that is related to each other (e.g., in a way that makes sense to the users of the content itself—as opposed to creators of the contents).

For example, data collected from the web can be initially segregated to identify possible tagging trends based on type of item. Tagging trends can then be analyzed in order to group items that have a relationship into one or more sets of related indexes based on aggregate of user notions regarding resource relationships. Subsequently, such possible relationships/indexes are further examined to determine whether they in fact converge and utilized to designate criteria for taxonomy purposes. A recognition component (not shown) can further employ such discovered user trends during tagging, to train the machine learning engine for item recognition. For example, photo recognition can be enabled by analyzing world wide tagging trends of Internet users, who are annotating digital photos based on objects pictured therein. For instance, when a plurality of digital photos are tagged as "dog" pictures by different users, (e.g., 100,000 digital photos tagged as "dogs" throughout a network) such tagging trend can be employed to teach a machine learning system how a dog is represented in a digital photograph. Likewise, such machine learning system can be further trained to recognize special breed of dogs, (e.g., discern "beagles" based on user tagging behavior when tagging digital photos of beagles.) Accordingly, by analyzing an entire set of annotations performed by millions of users, machine learning algorithms can be improved. Similarly, and in addition to identifying correlations, web engines that are associated with such machine learning systems can also provide supplemental functions, such as for example: mitigating false positives, targeting advertising based on demographics associated with manually tagged content, error checking of trained models, creating easy to use tools to facilitate manual tagging, unify standard for manual tagging, and provide applications associated with such concepts.

Figure 9:
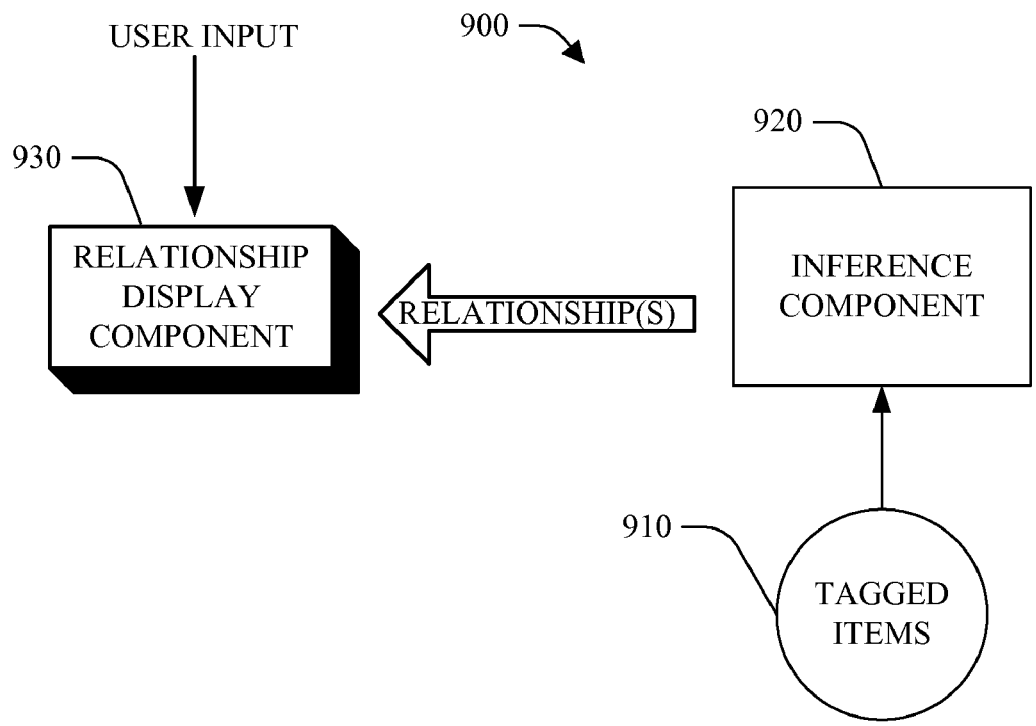
FIG. 9 illustrates a relationship display component that can display possible inferred relationships among resources in accordance with an aspect of the subject innovation.

In a related aspect, and as illustrated in FIG. 9, the subject innovation can further employ a relationship display component 930. The relationship display component 930 can create a visual representation of inferred relationships among tagged items 910 based on relationship(s) inferred by the inference component 920. The visual representation can further be based in part upon: user input (e.g., predetermined relationships that can be forced among tags; threshold quantity of tags to be displayed, threshold strength of relationship, color settings, and the like.) For example the visual representation can choose to manually change an inferred tagging trend, and change the corresponding content presented. Moreover, the relationship component 930 can further enable users to "dig down" into the inferred relationship/hierarchy, and/or to broaden the view as if moving to a higher hierarchy element.

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
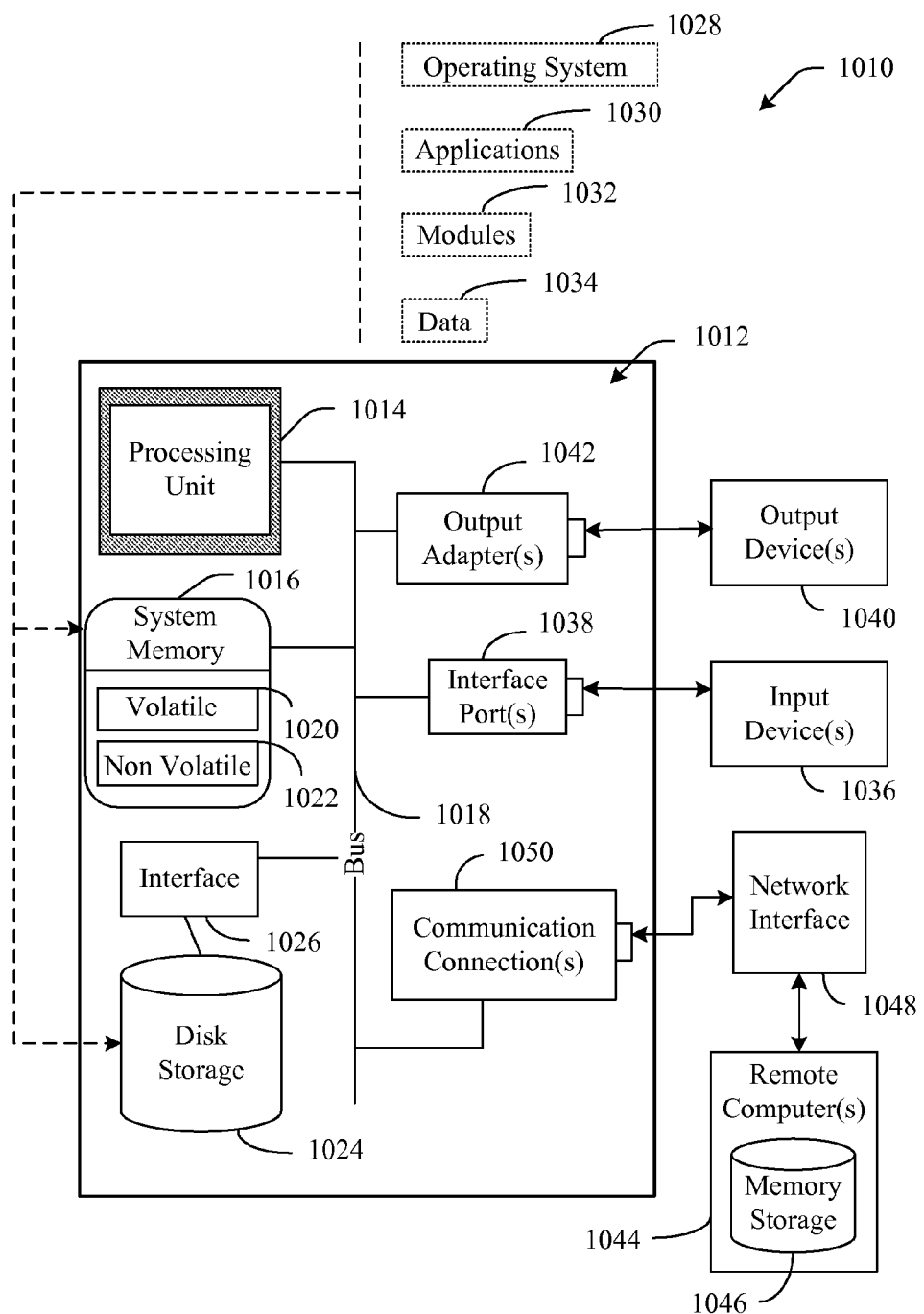
FIG. 10 illustrates an exemplary operating environment for implementing various aspects of the subject innovation.
Figure 11:
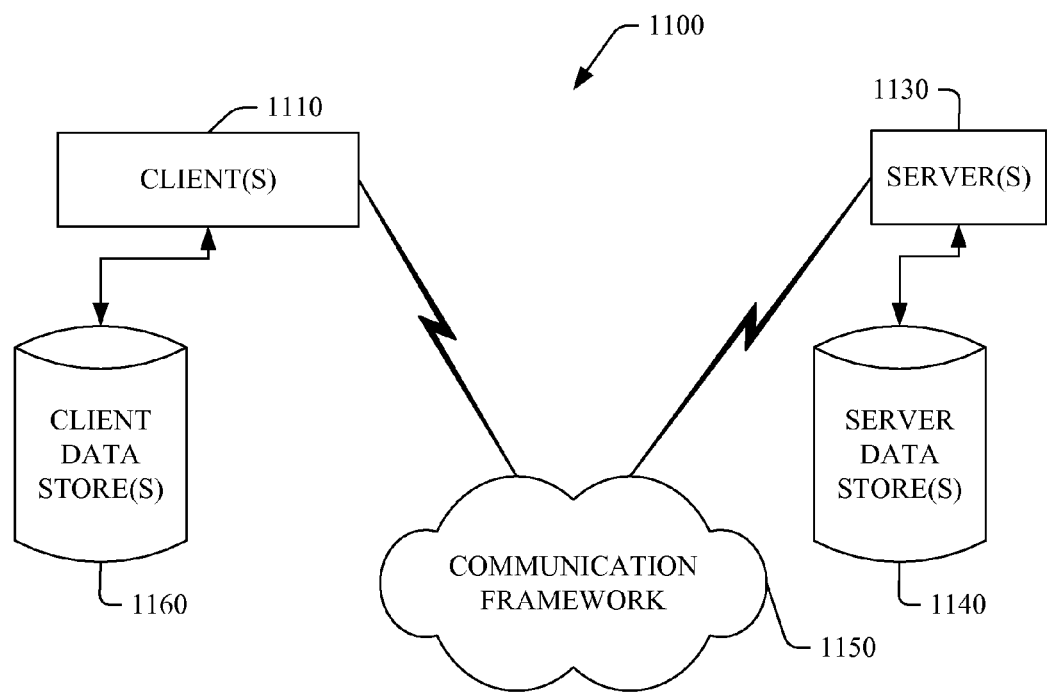
FIG. 11 illustrates a schematic block diagram of a sample computing environment with which the subject innovation can interact.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed for analyzing aggregated tagging behavior of users. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising the following computer executable components:
   an association component that relates resources based on an aggregate of user notions that are assigned to relationships, the association component incorporating an artificial intelligence component in conjunction with a training model to determine tagging trends via an automatic classifier system, a classifier in the automatic classifier system comprising a function that maps an input attribute vector x=(x1, x2, x3, x4, xn) to a confidence that an input belongs to a class comprising the function f(x)=confidence(class);
   a storage medium that stores the relationships;
   unique references that tie the resources together, the unique references comprising a plurality of links, the plurality of links appearing to users of the resources to be directly added to the resources, wherein at least one of the plurality of links is utilized to link two existing web pages based on user preferences, wherein the user preferences are independent of association preferences set by creators of the web pages;
   an inference component that infers relationships between the resources upon the resources being tagged as being relevant for a particular purpose, wherein the relationships are inferred by scoring at least one potential tagging trend from a list of potential tagging trends for auto suggestion to the users of the resources,
   wherein the scoring comprises assigning a point for each time one of the resources has been employed with a tagging trend, wherein the list of potential tagging trends is selected by employing a statistical analysis, the statistical analysis comprising a number of standard deviations away from a statistical mean,
   wherein resources more than two standard deviations away are employed for auto suggesting a tagging trend based on a collective user behavior;
   a client component that performs tagging via metadata derived from the relationships, wherein the client component further:
      adds the metadata to the resources;
      connects into an external search system for performing a search with the metadata, wherein the metadata is exposed as fake web pages, the fake web pages comprising at least one list of tagged user Uniform Resource Locators (URLs), wherein the at least one list of tagged URLs is employed directly by the external search system; and
      enhances an inverted look up table via additional rows based on the metadata, the metadata implementing user notions regarding resource relationships; and
   a middle tier that implements logic involved to relate the resources and infer states of the computer implemented system, an environment and a user from a set of observations captured via events and data,
   wherein an inference is employed to generate a probability distribution over the states to update previously inferred schema and tighten criteria on an inferring algorithm based upon a kind of data being processed.

2. The computer implemented system of claim 1, the aggregate of user notions further based on at least one of: machine learning; assigned notions; and inferred notions.

3. The computer implemented system of claim 2 further comprising a security component that restricts access to the relationships.

4. The computer implemented system of claim 1 further comprising a client tier that manages user experience for the relationships.

5. The computer implemented system of claim 4 further comprising a backend tier that supplies database pivots and joins in support of the resource relationships.

6. The computer implemented system of claim 4 further comprising a metadata extraction component that pulls text forms to be added to index.

7. The computer implemented system of claim 6 further comprising an indexer that stores relationships as part of Structured Query Language.

8. The computer implemented system of claim 7 further comprising a puller component that performs off-line pulling of resources for metadata extraction.

9. A computer implemented system comprising the following computer executable components:
   an association component that relates resources or entities based on an aggregate of user notions that are assigned to relationships, the association component incorporating an artificial intelligence component in conjunction with a training model to determine tagging trends via an automatic classifier system, a classifier in the automatic classifier system comprising a function that maps an input attribute vector x=(x1, x2, x3, x4, xn) to a confidence that an input belongs to a class comprising the function f(x)=confidence(class), wherein the entities comprise at least one of people, paper documents, static/dynamic web pages, files, emails, and multimedia files;
   a storage medium that stores the relationships;
   unique references that tie at least one of the resources or entities together, wherein the unique references comprise a plurality of links, the plurality of links appearing to users of the at least one of the resources or entities to be directly added to the at least one of the resources or entities, the plurality of links comprising at least one of data types, metadata, resource locations, and hash signatures, wherein at least one of the plurality of links is utilized to link at least two existing resources or entities based on user preferences, wherein the user preferences are independent of association preferences set by creators of the resources or entities;
   an inference component that infers relationships between the resources upon the resources being tagged as being relevant for a particular purpose, wherein the relationships are inferred by scoring at least one potential tagging trend from a list of potential tagging trends for auto suggestion to the users of the resources,
   wherein the scoring comprises assigning a point for each time one of the resources has been employed with a tagging trend, wherein the list of potential tagging trends is selected by employing a statistical analysis, the statistical analysis comprising a number of standard deviations away from a statistical mean,
   wherein resources more than two standard deviations away are employed for auto suggesting a tagging trend based on a collective user behavior, wherein a pseudo-hierarchy is created, based, at least in part, upon the tagged resources and user behavior relationships between the resources;
   a client component that performs tagging via metadata derived from the relationships, wherein the client component further:
   adds the metadata to the resources;
   connects into an external search system for performing a search with the metadata, wherein the metadata is exposed as fake web pages, the fake web pages comprising at least one list of tagged user Uniform Resource Locators (URLs), wherein the at least one list of tagged URLs is employed directly by the external search system; and
   enhances an inverted look up table via additional rows based on the metadata, the metadata implementing user notions regarding resource relationships; and
   a middle tier that implements logic involved to relate the resources or entities and infer states of the computer implemented system, an environment and a user from a set of observations captured via events and data,
   wherein an inference is employed to generate a probability distribution over the states to update previously inferred schema and tighten criteria on an inferring algorithm based upon a kind of data being processed.

10. The computer implemented system of claim 9, the aggregate of user notions further based on at least one of: machine learning; assigned notions; and inferred notions.

11. The computer implemented system of claim 10 further comprising a security component that restricts access to the relationships.

12. The computer implemented system of claim 9 further comprising a client tier that manages user experience for the relationships.

13. The computer implemented system of claim 12 further comprising a backend tier that supplies database pivots and joins in support of the resource relationships.

14. The computer implemented system of claim 12 further comprising a metadata extraction component that pulls text forms to be added to index.

15. The computer implemented system of claim 14 further comprising an indexer that stores relationships as part of Structured Query Language.

16. The computer implemented system of claim 15 further comprising a puller component that performs off-line pulling of resources for metadata extraction.

* * * * *